United States Patent [19]

Brooke et al.

[11] Patent Number: 4,630,470
[45] Date of Patent: Dec. 23, 1986

[54] REMOTE SENSING OF VEHICLE TIRE PRESSURE

[75] Inventors: Robert L. Brooke, Woodbridge; Peter J. McConnell, Vienna, both of Va.; Anthony M. Testa, Elkridge, Md.; George B. Maksymonko, Springfield, Va.

[73] Assignee: The United States of America as represented by the Secretary of the Army, Washington, D.C.

[21] Appl. No.: 672,327

[22] Filed: Nov. 16, 1984

[51] Int. Cl.[4] .................................. G01M 17/02
[52] U.S. Cl. .................................. 73/146.2
[58] Field of Search .................. 73/146, 146.2, 146.5, 73/584, 8, 52; 340/58

[56] References Cited

U.S. PATENT DOCUMENTS

| 1,849,730 | 3/1932 | Morse | 73/146 |
| 3,001,394 | 9/1961 | Nelson | 73/146 |
| 4,355,299 | 10/1982 | Cook | 73/146.2 |

Primary Examiner—Donald O. Woodiel
Attorney, Agent, or Firm—John E. Becker; Roger F. Phillips; Anthony T. Lane

[57] ABSTRACT

Apparatus and a method for determining the tire pressures of vehicles as they pass an instrumented checkpoint on a roadway. Rigid corrugations on the roadway set the tires into vibration with a waveform which is a function of tire pressure. The complex waveforms from each tire of a given vehicle are subjected to a spectral analysis and the results of such analyses are compared to each other to determine which, if any, of said tires have produced a spectrum different from the normal spectra produced by the other tires. This invention requires no apparatus mounted on the vehicles being checked.

6 Claims, 5 Drawing Figures

REMOTE SENSING OF VEHICLE TIRE PRESSURE

The invention described herein may be manufactured, used and licensed by or for the Government for governmental purposes without the payment to us of any royalties thereon.

BACKGROUND OF THE INVENTION

This invention relates to apparatus and a method for remotely sensing the differential tire pressure of vehicles as they pass a checkpoint. Abnormal tire pressure in large vehicles such as trucks and busses constitutes a serious safety hazard in that low tire pressure can cause such things as sudden tread separation, separation of tires and wheels, or in the case of many trucks, explosive separation of wheel safety rims. High tire pressure can cause blow-outs. In the case of aircraft, tire failure can result in loss of control during landing or takeoff, with the serious risk of personal injury and/or property damage.

Prior art methods of tire pressure measurement include the use of a pressure gauge manually applied to each tire valve, or, the custom among some truckers of kicking of tires to find the ones which "sound" low in pressure. These methods are slow and unreliable and require that the vehicle be stopped to check the pressure. Many commercial vehicles travel long distances between stops and new regulations permit the carrying of heavier loads, which makes the consequences of unsafe tire pressures more critical.

The prior art also includes apparatus for automatically measuring the tire pressures of moving vehicles as the vehicle passes an instrumented checkpoint. Such apparatus usually requires that the vehicles carry a tire pressure sensor for each tire, and as the vehicle passes the checkpoint, the sensors are all interrogated by means of a radio transceiver which has its antenna mounted in the roadway at the checkpoint. An example of such apparatus is found in U.S. Pat. No. 4,067,235, issued to Markland on Jan. 10. 1978. Another similar system is shown in the Venema U.S. Pat. No. 4,363,020, issued on Dec. 17, 1982. In the Venema patent, an interrogating signal is transmitted from the vehicle to passive pressure transponders mounted on each wheel. The signals received from the transponders are an indication of tire pressure and abnormal pressures can be displayed to the vehicle's driver.

U.S. Pat. No. 4,355,299 issued to Cook on Oct. 19, 1982 shows a system for detecting low pressure tires in dual-wheeled vehicles in which the dual wheels pass over a plurality of liquid-filled flexible hoses which are disposed parallel to the direction of vehicle travel at a checkpoint. Low pressure tires are detected by comparing the pressure patterns in the hoses with reference patterns for normal inflation. The disadvantages of this system are that a large number of normal pressure patterns for a large number of makes and models of vehicles to be checked must be stored in the apparatus, and the make and model of the vehicle being checked must be determined before the test is made. Also, the pressure in the hoses is a function of the weight and loading of the vehicle and this can cause inaccurate results.

SUMMARY OF THE INVENTION

The present invention provides a practical, self-calibrating, automatic and nearly instantaneous method to measure differential or relative tire pressure on multi-wheeled vehicles as they traverse a permanent checkpoint. No part of the apparatus is located on the vehicles being checked and the specific tire or tires which differ in pressure from the others is indicated on a display. No storage of information regarding normal tire pressures is required.

In its broadest aspect, the invention comprises means on a roadway at the checkpoint to mechanically excite or set into vibration the tires of the vehicle. This vibration-inducing means may comprise a plurality of corrugated sections comprising a series of parallel metal ridges mounted on a rubber base, with a sensor or transducer attached to each section. The sections are arranged on the roadway with the corrugations perpendicular to the direction of vehicle travel. Each of the ridges will impart an energy impulse to the tire, the magnitude of which is directly proportional to the tire pressure, the vehicle speed and tire width. The corrugated sections will then vibrate at a range of frequencies which is determined by the tire size, the vehicle speed and the tire pressure. These distinctive vibrations are sensed and converted to an analog electrical signal by the aforementioned transducer in each of the corrugated sections, and circuit means are provided for the spectral analysis of the outputs of each transducer. The spectrum of each of the transducer outputs is compared to the spectra of all other transducer outputs to determine which, if any, depart from the normal or majority spectra. The circuitry includes a display which can indicate to the driver which of the tires is of abnormal pressure, the display being remote of the vehicle.

The spectral analysis can be performed by known means, for example, by a microcomputer properly programmed.

It is thus an object of the invention to provide a method and means for detecting vehicles tires of abnormal pressure by mechanically vibrating the tires as the vehicle passes over a series of ridges comprising metal corrugations, or corrugated sections, and picking up the resulting vibrations and converting them to corresponding electrical signals, and means for determining the spectral content of each of the electrical signals. The spectral content represents the conversion of the complex vibration signal into the frequency domain. Next a comparison is made between the frequency domain information derived from the tires of each vehicle, which can be accomplished using a statistical technique which results in a covariance matrix. The covariance matrix is a procedure for examining or comparing the covariance coefficients from different events, in this case the individual tire passages, and identifying which events differ significantly from the ensemble of events comprising the coefficients resulting from all of the other tire passages of a given vehicle. A vehicle proximity detector provides a signal for actuating the circuitry on the approach of a vehicle, and the vehicle axles run over the aforementioned corrugated sections in sequence. The sections are arranged across a lane of a roadway so that at least two sections will be simultaneously actuated by each tire and also so that there will be at least one section between the dual wheels of four-wheeled axles.

Another object of the invention is to provide a novel technique for remotely measuring the relative tire pressures of vehicles by processing the vibrational waveforms caused by the tires as they run over a corrugated array of sections on the roadway, and identifying tires of abnormal pressure by the abnormal vibrational waveforms produced by such tires.

These and other objects and advantages of the invention will become apparent from the following detailed description and the drawings.

DETAILED DESCRIPTION OF A PREFERRED EMBODIMENT

Figure 1:
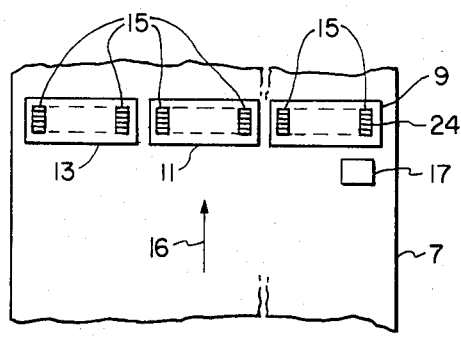
FIG. 1 is a plan view showing how the roadway is instrumented for practicing the invention.

As stated above, the concept of the present invention comprises applying an energy impulse to the tires of vehicles as they pass the instrumented checkpoint to produce a mechanical vibration or waveform which is a function of tire pressure. Such a waveform will necessarily be a complex one comprising a fundamental and numerous harmonic components. It is well known in the prior art that complex waveforms can be subjected to spectral analysis by means of techniques such as Fourier analysis, to determine the sinusoidal components of the complex waveform. The resulting Fourier coefficients comprise the amplitudes of the various sinusoidal components. These components are the fundamental and the harmonics thereof, and sometimes a direct current or steady component. Fourier analysis can be done mathematically if a mathematical description of the complex waveform is known, or it can be done by means of a computer program or algorithm known as the Fast Fourier Transform. Further, the spectral analysis can also be done by electrical techniques such as applying the complex waveform to a bank of resonant filters having different resonant frequencies spanning the range of expected frequency components, or by means of a single tunable resonant circuit which is swept in frequency or tuning over the range of expected frequency components in the waveform to be analyzed.

The concept of the present invention involves the recognition that all of the tires of a particular vehicle which are all subjected to the same mechanical impulse will produce substantially the same vibrational waveform if the tire pressures are all approximately the same. The same mechanical impulse is achieved for each vehicle tire by driving the vehicle at a constant speed, which is not critical, over the aforementioned array of corrugated sections. As stated above, the resultant vibrational waveform will be a function of certain other factors besides tire pressure, for example, the vehicle speed. An increase in speed will generally shift all of the aforementioned sinusoidal components of the complex waveform upward in frequency, however at any given constant vehicle speed the waveform frequency components and their amplitudes will all be similar for similar tire pressures. With the present technique of comparing the spectral content of the tire waveforms to each other, no reference data concerning the normal tire pressures need be stored in the system since abnormal pressure is detected by the difference in the spectral or Fourier coefficients of the tire or tires of abnormal pressure. Generally a low pressure tire will produce a complex waveform with all of its frequency components shifted downward in frequency compared to the tires of normal pressure. This system and method thus is simpler and easier to instrument than ones which measure absolute pressures. It has the slight disadvantage that if all of the tires are low in pressure, it will indicate a normal condition, however such a situation would be rare and extremely low pressure in all vehicle tires would probably be evident to the driver from either a visual inspection while stopped or from the handling or feel of the vehicle on the road.

FIG. 1 shows an aerial or plan view of a checkpoint which has been instrumented for the practice of this invention. The roadway 7 comprises a single traffic lane which is spanned by a plurality of side-by-side corrugated sections 15. These sections may be arranged in panels 9, 11 and 13, each comprising, for example, twenty 2½ inch wide sections, 15, with three or more panels lined up across the traffic lane. With this arrangement, each tire of any vehicle which crosses the checkpoint will pass over at least two of the corrugated sections, and the circuitry can distinguish between the tires of dual wheeled vehicles since at least one corrugated section will be in the space between the dual wheels on one side of an axle. The direction of traffic flow is indicated by the arrow 16 in FIG. 1. A vehicle proximity sensor 17 is located just ahead of the arrays of corrugated sections. This sensor initiates the processing of the waveforms generated by the transducers or sensors in the corrugated sections and also serves to distinguish a single vehicle with four axles from a pair of two-axle vehicles. The length of the sections 15 along the direction of travel is not critical but it should be approximately 25% of all circumference of the largest tire to be checked. It can be seen that with this arrangement, each vehicle axle will in turn pass over the corrugated sections, generally with each wheel on each axle simultaneously actuating two or more adjacent corrugated sections.

Figure 2:
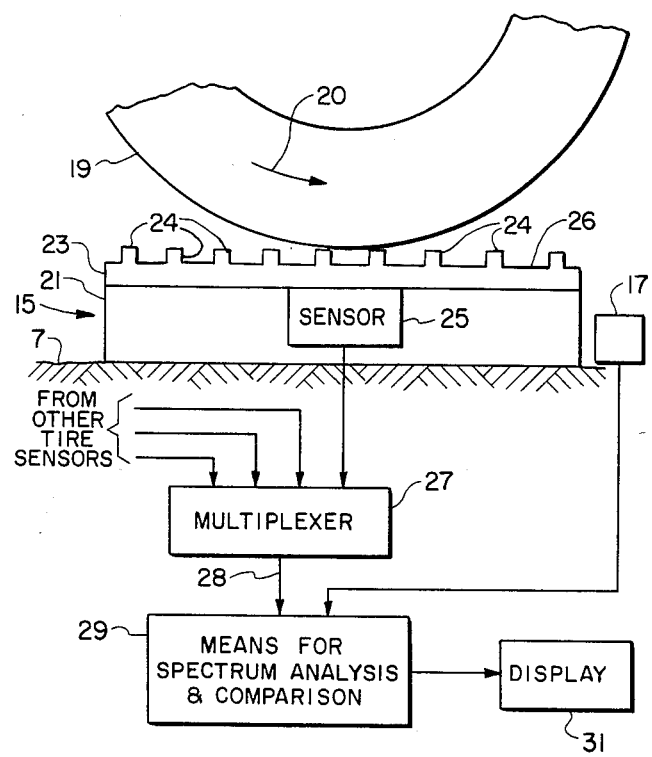
FIG. 2 is a block diagram illustrating a vehicle wheel passing over a corrugated section and circuitry which may be used in practicing the invention.

FIG. 2 shows a side view of a corrugated section 15 with a tire 19 rolling over it travelling to the left as indicated by the arrow 20. The section 15 comprises a hard rubber base 21 which rests on the pavement 7. A metal plate 23 has a parallel array of metal ridges 24 integrally formed therein. The plate 23 is bonded to the rubber base 21 and each of the corrugated sections has a separate tire sensor 25 attached thereto. These sensors are transducers such as piezoelectric crystals which convert the mechanical vibrations caused by the tires to identical electrical waveforms. The spacing 26 between adjacent ridges varies with the type of vehicle being checked. It has been found that the ideal spacing for a jeep is 2.0 inches, and 3.1 inches for a 5 ton military truck. In accordance with the invention, the spacing between the ridges is variable within this range. For example, at one end of the section, for example the left end as viewed in FIG. 2, the ridge spacing would be 2.0 inches, and 3.1 inches at the other end, with the intervening ridge spacings varying between these two limits. Thus vehicles of widely different sizes will pass over several ridges with ideal spacing for that vehicle. It has been found that the height of the ridges should be approximately one eighth of an inch. The ridge plate 23 may be other than metal.

As shown in FIG. 2, each of the sensors 25 of all of the corrugated sections 15 are connected to a single multiplexer 27. The multiplexer comprises means to rapidly scan or sample the outputs of all of the sensors 25 in sequence to obtain a single electrical signal on its output lead 28 which comprises interleaved samples of all of the sensors' outputs, in time division multiplexed format. These multiplexed signals are then applied to circuit 29 which comprises means to perform a separate spectrum analysis on each of the sensor outputs. This spectrum analysis results in the Fourier coefficients representing the amplitudes of the various frequency components in each of the complex analog sensor waveforms. This spectrum analysis involves converting the time domain complex waveforms in the output of each of the tire sensors into its equivalent frequency domain format. This can be accomplished by any of several prior art techniques which were discussed above. One would have to apply the output of each sensor to a bank of electrical or mechanical analog filters each turned to a different frequency. The magnitude of the different filter outputs is proportional to the Fourier coefficient of the frequency component corresponding to the filter tuning. Also, a commercially available digital filter can be used for spectrum analysis if the analog tire sensor waveforms are first digitized by means of an analog-to-digital converter.

Another alternative is the use of a microcomputer which obtains the frequency domain information from the digitzed and multiplexed tire sensor signals by means of the aforementioned procedure or program known as the Fast Fourier Transform.

The aforementioned spectrum analysis results in a plurality of numbers representing the amplitudes of Fourier coefficients of each of the frequency components in the output of each tire sensor and these numbers can be compared to each other by using a statistical technique which results in the aforementioned covariance matrix. This matrix is not a hardware item but is a procedure program wherein a computer would compare the various Fourier coefficients representing the same frequency component in the outputs of different tire sensors to determine which, if any, of the spectra differ substantially from the norm or majority spectra. The circuitry is capable of identifying the one or more tires of differing pressure and this information is applied to display 31 of FIG. 2.

Figure 4:
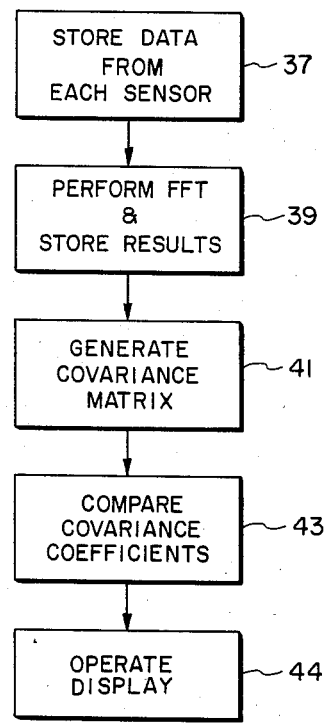
FIG. 4 is a block diagram which illustrates how the computer of FIG. 3 is programmed.
Figure 3:
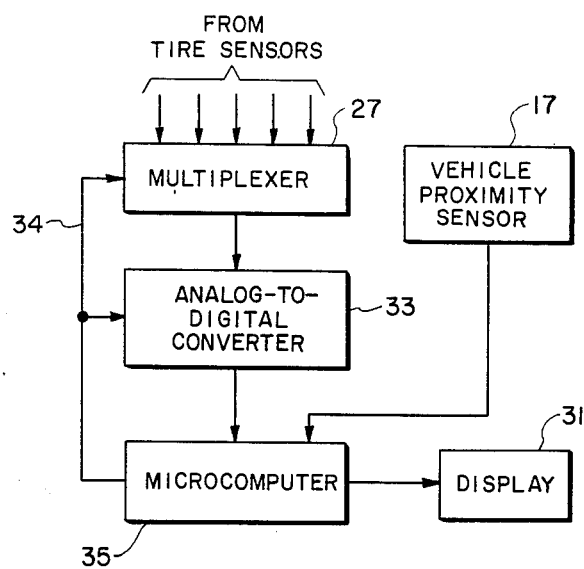
FIG. 3 shows in more detail circuitry which may be used for spectral analysis and comparison of the outputs of the tire vibrational sensors.

FIGS. 3 and 4 show how a commercially available microcomputer 35 may be used to practice this invention. The low cost and ease of programming of these computers makes them perhaps the easiest and least expensive way to implement this invention. In FIG. 3, the multiplexer 27 receives the analog complex waveforms from all of the tire sensors 25 and produces a multiplexed, interleaved sequence of analog voltage samples, as explained above. This multiplexed signal is applied to analog-to-digital converter 33 which converts each of the analog voltage samples from the multiplexer to a binary number comprising a plurality of binary ones and zeros. These binary numbers are in proper format for processing by any digital computer. The computer 35 controls and synchronizes the operation of the multiplexer and analog-to-digital converter by means of control or clock signals applied to these circuit elements over lead 34. Also, the vehicle proximity sensor output is applied to the computer for control purposes, as explained above. The binary digital numbers from the analog-to-digital converter are applied to the computer, as shown. FIG. 4 shows one example of a sequence of operations or a program for the computer 35 which can be used to perform the spectrum analysis and comparison of the sensor signals. The first step indicated by box 37 is to separately store in computer memory the digitized signal from the outputs of each sensor. The next step, represented by box 39, comprises performing the Fast Fourier Transform on the stored data for each sensor and storing the results in memory. This stored data then represents the frequency domain version of the output of each sensor. Next a program, represented by box 41, is executed which generates the covariance matrix explained above. The next box, 43, comprises the actual comparison of the covariance coefficients which can identify tires of abnormal pressure. The last step in the program, box 44, comprises suitably operating the display 31 to indicate the results of the spectrum analysis and comparison. The display 31 may be placed in view of the vehicles' drivers to advise them of the location of the tires of abnormal pressure. Said display 31 preferably is remotely disposed, such as above or alongside of the roadway.

Figure 5:
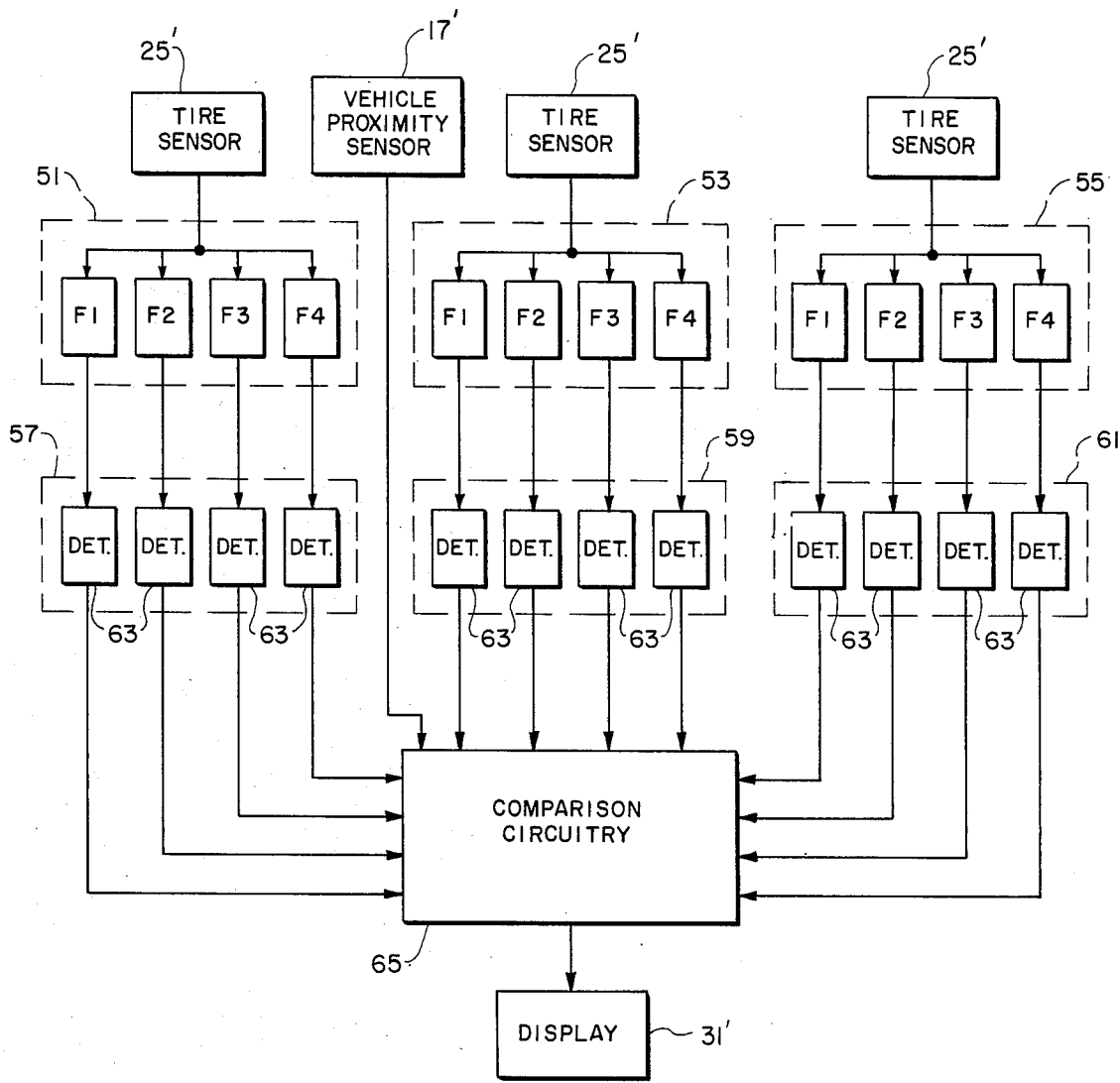
FIG. 5 shows alternative circuitry with which the invention may be carried out.

FIG. 5 shows how the invention can be practiced with substantially different hardware comprising banks of analog electrical filters connected to the outputs of each of the tire sensors. This embodiment of the invention does not require a multiplexer or an analog-to-digital converter; however, it does require a large number of filters and detectors. Three tire sensors 25' are shown with the outputs thereof each connected to separate electrical filter banks 51, 53 and 55. Each of the filter banks is identical and comprises a plurality of resonant filters F1–F4, which have different resonant frequencies which may, for example, be multiples of each other. For example, F1 may represent a fundamental frequency and F2 the second harmonic thereof, with F3 the third harmonic and F4 the fourth harmonic. Alternatively, the filters may be tuned to adjacent bands of frequencies so that each filter bank covers a continuous band from the lowest frequency of F1 to the highest frequency of F4. The output of each of the filters will be a sinusoidal signal at the frequency of one of the frequency components of the complex wave form in the output of the sensor connected to that filter bank. The amplitude of this sinusoid represents the Fourier coefficient of the frequency component represented by that particular filter. These amplitudes are converted into direct current voltages by corresponding banks of detectors 57, 59 and 61 whose corresponding plurality of detectors are respectively connected to the outputs of each filter in the filter banks. The detectors 63 may comprise merely diode rectifiers with filter capacitors connected thereto. The detector outputs are all connected to comparison circuitry 65 which can be arranged to perform the comparison by means of circuitry which is analogous to the covariance matrix performed by the computer of FIG. 2. The comparison circuitry 65, may, for example, comprise means to subtract the detector output of one filter from the corresponding filter of a different filter bank. A difference which differs substantially from zero would indicate the presence of that substantial difference in the two detector outputs. For example, the comparison circuitry may subtract the detected output of filter F4 to filter bank 51 from the detected output of filter F4 of filter bank 55 to compare the coefficients corresponding to these filter frequencies. If both or these detected outputs were the same, the difference would be zero.

The output of the vehicle proximity sensor 17' is connected to the comparison circuitry 65 for control purposes. The display 31' functions in the same way as does the display in the other embodiment. In the practice there would be many more sensors and many more than four filters per filter bank.

While the invention has been described in connection with illustrative embodiments, obvious variations therein will occur to those skilled in this art, accordingly the invention should be limited only by the scope of the appended claims.

What is claimed is:

1. Apparatus for remotely sensing differential tire pressures of vehicles as they pass an instrumented checkpoint on a roadway, comprising: a plurality of rigid corrugated sections adapted to be adjacently arrayed across a single lane roadway so that each tire of each vehicle will simultaneously traverse at least two adjacent corrugated sections, said corrugated sections comprising a series of parallel hard ridges arranged perpendicular to the direction of vehicle travel, with a transducer or sensor attached to each of said corrugated sections for detecting vibrations indicative of different tire pressures as the vehicle traverses said corrugated sections, circuit means connected to all of said sensors for performing a spectral analysis and comparison of the output of each of said sensors to the outputs of all other of said sensors as the vehicles traverse said array of corrugated sections, and display means connected to said circuit means for indicating the tire or tires of vehicles which produce an abnormal spectrum indicative of abnormal tire pressure.

2. The apparatus of claim 1 wherein said circuit means comprises a multiplexer connected to all of said sensors and having a single output connected to an analog-to-digital converter, the output of said analog-to-digital coverter being applied to a microcomputer, said microcomputer having a control lead connected to said multiplexer and to said analog-to-digital converter, and a vehicle proximity sensor disposed on said roadway ahead of said array of corrugated sections and operatively connected to said microcomputer, said microcomputer being programmed to (a) separately store in memory the digitized outputs of each of said sensors applied thereto from said analog-to-digital converter, (b) then perform a Fast Fourier Transform on said stored data and store the results in memory, (c) then generate and execute a covariance matrix in which the stored results of said Fast Fourier Transform are compared to each other to identify tires of abnormal pressure, and (d) then suitably operate said display means.

3. The apparatus of claim 1 wherein said corrugated sections each comprises a metal plate having parallel ridges integrally formed thereon, said ridges having a variable spacing ranging from about 2.0 to 3.1 inches, and said ridges being approximately one eighth of an inch in height.

4. The apparatus of claim 1 wherein said circuit means comprises
identical filter banks operatively connected to the outputs of each of said sensors, said filter banks each comprising a plurality of resonant filters tuned to different frequencies;
a corresponding plurality of detectors operatively connected to each of said resonant filters;
comparison circuitry to which outputs of said detectors are are operatively connected, said comparison circuitry adapted to compare the outputs of each detector to its corresponding detector in every other of said filter banks so as to determine which if any of the compared detector outputs differ substantially from each other and thereby indicate a tire or tires of abnormal pressure; and
wherein said display means is connected to said comparison circuitry.

5. A method of determining the differential or relative tire pressures of moving vehicles as they drive over an instrumented checkpoint, comprising the steps of;

(a) imparting a mechanical impulse to each of the tires of said vehicles as they pass said checkpoint;

(b) detecting the vibrations resulting from said impulse and converting said vibrations to a corresponding electrical signal;

(c) performing a spectral analysis on each of said electrical signals from each of said tires, and (d) comparing the results of said spectral analyses to determine which, if any, of said tires produces a spectrum substantially different from the normal spectra produced by all of the other tires.

6. Apparatus for remotely sensing differential tire pressures of vehicles as they are driven over an instrumented checkpoint, comprising;
corrugations at said checkpoint for causing the tires of vehicles to vibrate with a complex wavelength which is a function of the tire pressure; and
circuit means to sense and detect and to perform a spectral analysis of said complex waveform for each tire of each vehicle, and to compare the results of said spectral analyses, and
thereby identify which tire or tires exhibit a different spectrum from the majority of the tires which is indicative of abnormal pressure in those tires of different spectra.

* * * * *